United States Patent
Kamentsky et al.

[15] 3,662,176
[45] May 9, 1972

[54] PHOTO-OPTICAL PARTICLE ANALYSIS METHOD AND APPARATUS

[72] Inventors: Louis A. Kamentsky, Briarcliff Manor; Isaac Klinger, Yorktown Heights, both of N.Y.

[73] Assignee: Bio/Physics Systems, Inc., Katonah, N.Y.

[22] Filed: Apr. 6, 1970

[21] Appl. No.: 25,931

[52] U.S. Cl. ................. 250/218, 250/222 PC, 250/223 R, 356/39, 356/104, 356/208
[51] Int. Cl. ........................... G01n 21/26, G01n 33/16
[58] Field of Search.......... 250/43.5 R, 43.5 D, 218, 222 PC, 250/223 R; 324/71 PC; 356/39, 102, 103, 104, 181, 182, 208

[56] References Cited

UNITED STATES PATENTS

| | | |
|---|---|---|
| 3,449,053 | 6/1969 | Cannady et al. ............ 250/222 PC |
| 2,875,666 | 3/1959 | Parker et al. ............... 356/39 |
| 3,027,461 | 3/1962 | Kavanagh ................... 356/104 |
| 3,013,466 | 12/1961 | Kaye .......................... 356/104 |
| 3,412,254 | 11/1968 | Meyer-Doering et al. .... 250/222 PC |
| 3,453,438 | 7/1969 | Ban et al. .................... 250/218 |

Primary Examiner—Anthony L. Birch
Attorney—Curtis Ailes

[57] ABSTRACT

At least two different electrical optical reaction signal pulses are generated by particles passing through a beam of light. These signal pulses are electrically analyzed to discriminate true particle pulses from spurious noise pulses, to count the total number of particles, and to count a fraction of the total number of particles having particular characteristics to be distinguished.

25 Claims, 3 Drawing Figures

PHOTO-OPTICAL PARTICLE ANALYSIS METHOD AND APPARATUS

This invention relates to methods and apparatus for analyzing samples of material containing very small particles such as blood cells.

The accurate analysis of samples of small particles represents a great need. The need is particularly important in studies of air pollution and water pollution conditions. It is also very important in medical research and diagnosis. For medical purposes, blood cells and other biological cells must be counted and samples containing such cells must be analyzed to determine, for instance, whether there is an imbalance of cells of particular types.

In accordance with the present invention, small particles are passed one by one in a stream through an optical scanning station. At least two photo-optical detecting devices are arranged to detect the optical reactions of each particle to illumination from a beam of light. The different optical reactions detected by the different detecting devices produce electrical signals which may be used to detect differences in the various particles as they are scanned. The particles are preferably moved through the optical scanning station very rapidly, and the beam of optical illumination is preferably very narrow so that the electrical signals produced by the particles occur in short pulses.

One of the important problems in such an apparatus is to provide for sufficient sensitivity and for adequate discrimination between genuine particle signal pulses and spurious noise signals.

Accordingly, it is one important object of the present invention to provide for particle analysis apparatus having an improved sensitivity by provision of a very reliable means for discriminating between noise signals and genuine particle signals.

Another object of the invention is to provide improved automatic means for measuring a predetermined volume of the liquid sample containing the particles to be analyzed.

Another object of the invention is to provide means for automatically computing the fraction of the total number of particles within a particle sample which have particular characteristics to be distinguished.

Another object of the invention is to provide a particle analysis apparatus having improved means for reliably distinguishing particles having particular characteristics within a larger group of particles.

In carrying out the invention there may be employed a method for rapidly measuring and detecting small particles in a sample of particles to be analyzed including passing the particles one by one in a stream through a transverse beam of illumination. Measurement is made of at least two different optical reactions to the beam by each particle by means of electro-optical devices to generate electrical signals. The electrical signals are summed, and the resultant sum signal is tested to determine whether it exceeds a predetermined threshold to thereby discriminate true particle reaction signals from spurious noise signals.

Other features, objects and advantages of the invention will be apparent from the following description and the accompanying drawings.

Figure 1:
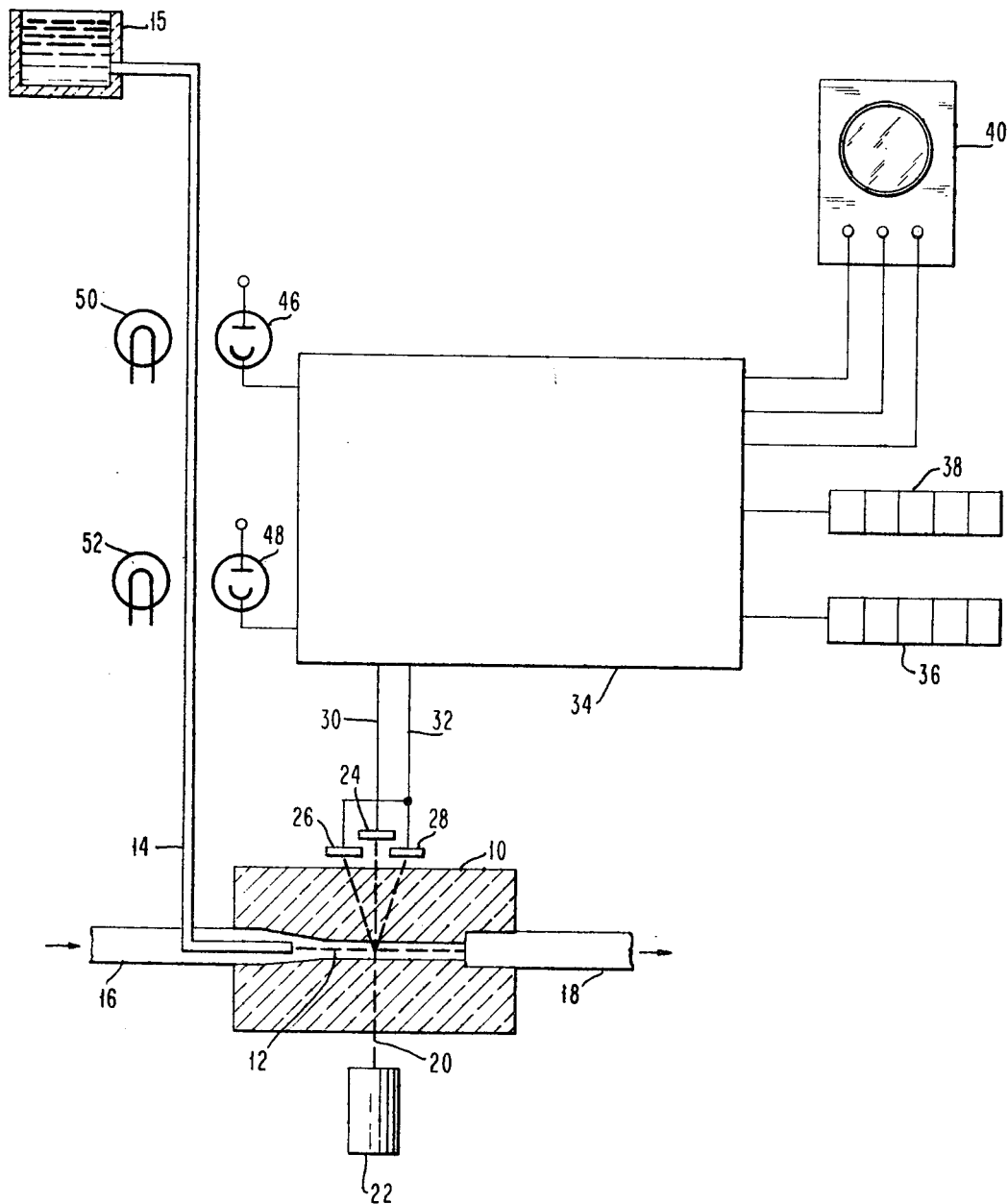
FIG. 1 is a schematic diagram of a system in accordance with the present invention.
Figure 3:
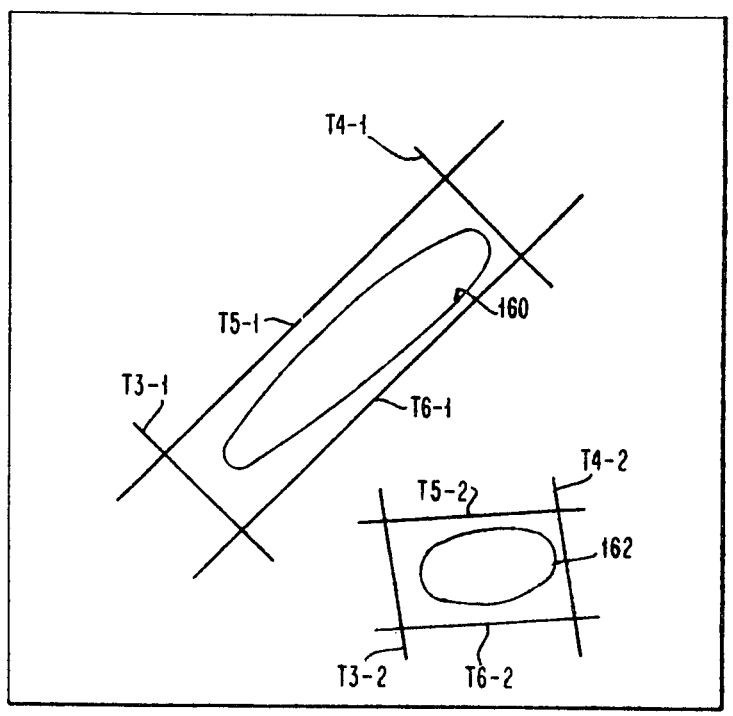

And FIG. 3 is a representation of patterns of display signals which may be selected and displayed upon the face of the cathode ray oscilloscope 40 of the system of FIG. 1.

Referring more particularly to the drawings, FIG. 1 illustrates a system for photoanalysis of small particles in accordance with the present invention. The system includes an optical chamber 10 through which a stream of particles 12 may be passed while entrained in a liquid and supplied through a pipe 14 from a reservoir 15. The stream of particles 12 is preferably surrounded by a sheath of water supplied through an inlet pipe 16, and the combined stream is discharged through a discharge pipe 18. As the stream 12 of particles passes through the chamber, it passes through a narrow beam of light 20 from a light source 22. Light source 22 is preferably a laser, and may include lenses for shaping and directing the light. Different optical reactions of the individual particles to the light beam 20 are detected by photoelectric pickup elements 24, 26, and 28. The photoelectric pick-up element 24, which is directly in line with the light beam 20, detects the amount of absorption of light by each particle. The photoelectric detectors 26 and 28 detect the narrow angle scatter of the light beam 20 by each particle. In a typical measurement situation, if some of the particles are stained, and others are not, the optical absorption signal detected by photoresponsive element 24 will increase for stained particles compared to unstained particles. On the other hand, the optical radiation scattered to the near angle scatter sensors 26 and 28 will not vary appreciably or will decrease for stained particles. Thus, the different signals provide a basis for distinguishing the characteristics of particular particles as well as for counting the total number of particles. The signals detected by photoresponsive pick-up elements 24, 26, and 28 are converted by those elements to electrical signal pulses which are supplied through connections 30 and 32 to an evaluation and utilization circuit 34.

The system as thus far described is preferably carried out in accordance with the teachings of a related co-pending prior U.S. Pat. application Ser. No. 2,750 filed on Jan. 14, 1970 by Mitchell Friedman, Louis A. Kamentsky, and Isaac Klinger for "Photoanalysis Apparatus" and assigned to the same assignee as the present application.

Analysis of the optical reaction signals in the circuit 34 causes that circuit to energize two counters 36 and 38. Counter 36 provides a count of the total number of particles within a predetermined sample, and counter 38 indicates the number of particles within the sample having a particular characteristic which is to be distinguished, such as a high optical absorption characteristic. The circuit 34 is also preferably connected to provide signals to a cathode ray oscilloscope 40.

The liquid sample containing the particles to be analyzed may be supplied to the pipe 14 from a source such as a reservoir 15. In order to provide a precise volume measurement for a particular volume of sample liquid to be analyzed, photocells 46 and 48 are provided at spaced points along the pipe 14, which is preferably composed of glass, to detect the presence or absence of liquid at the respective positions opposite those photocells. At the respective photocells there are provided separate light sources 50 and 52. When there is liquid in the portion of the pipe 14 directly between light source 50 and photocell 46, the liquid tends to focus the light from source 50 upon the photocell 46 to provide a higher level signal. However when that portion of pipe 14 is empty, and occupied only by air, the illumination is de-focused and the optical signal to photocell 46 is correspondingly reduced. This change in signal level at photocell 46 is detected within circuit 34. Photocell 48 reacts in a similar manner to illumination from light source 52. The portion of pipe 14 between photocells 46 and 48 may be referred to hereinafter as an elongated container having an entrance end at photocell 46 and an exit end at photocell 48.

In a preferred method of operation, when photocells 46 and 48 both detect the presence of liquid in tube 14, the circuit 34 causes both of the counters 36 and 38 to be reset to zero. When the trailing edge of the particle sample passes the upper photocell 46, so that the presence of air rather than liquid is detected, the particle count is permitted to begin. When the trailing edge of the liquid sample passes the lower photocell 48, the transmission of further count pulses to the counters 36 and 38 is stopped. Thus, the count values stored in the counters 36 and 38 is related to a volume of particle carrying liquid corresponding exactly to the volume of liquid stored within the tubing 14 between the respective photocells 46 and 48.

Figure 2:
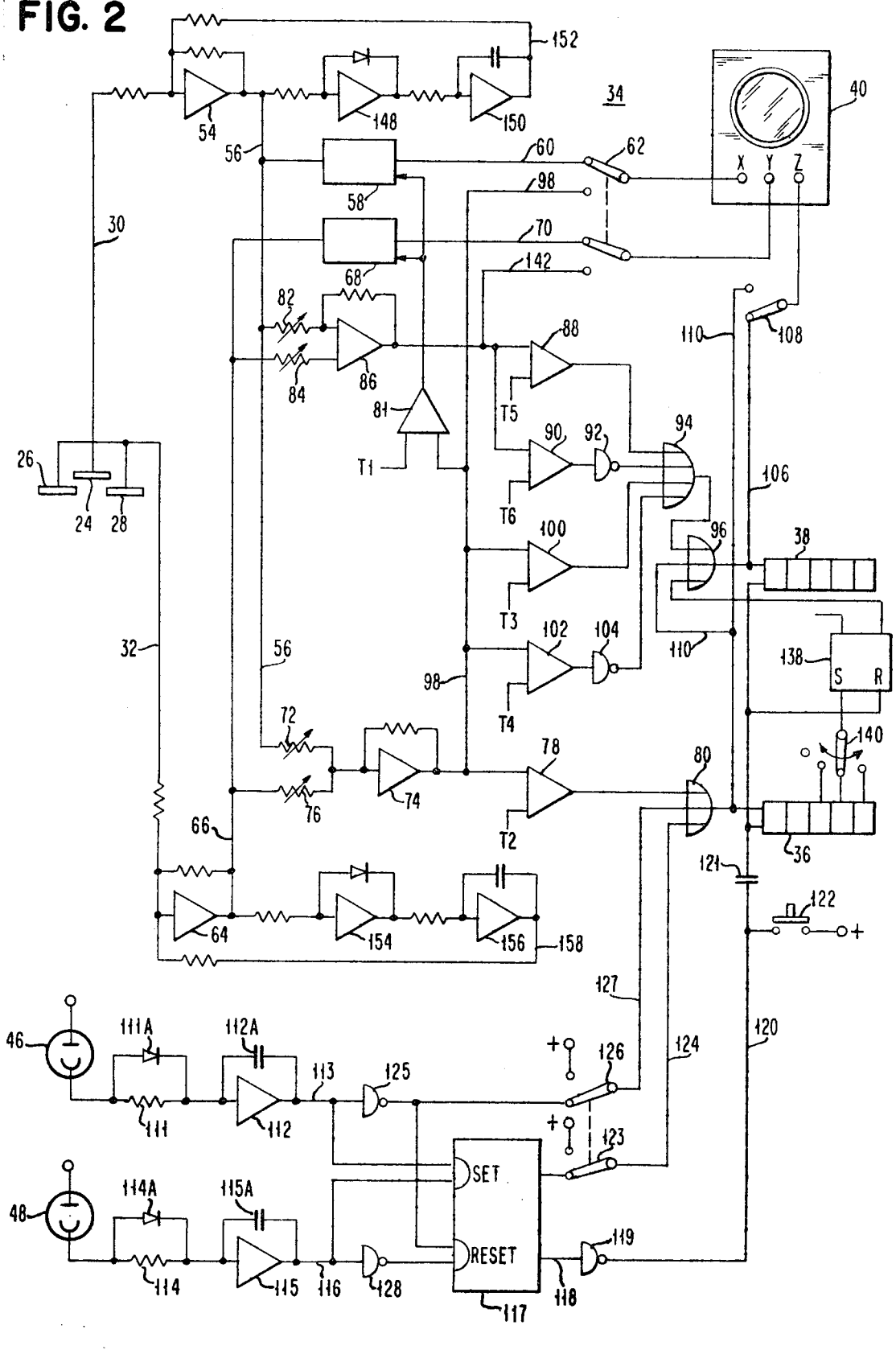
FIG. 2 is a schematic circuit diagram showing details of the circuit 34 of the apparatus of FIG. 1 together with components of the system immediately connected thereto.

FIG. 2 is a circuit diagram of the circuit 34 of Fig. 1 together with components directly connected to that circuit. In this circuit, the absorption signals supplied through connection 30 are amplified by an amplifier 54 and supplied through a connection 56 to a sample and hold circuit 58. From circuit 58, the signal is connected through a connection 60 and a gang switch 62 to the X axis input of the oscilloscope 40. Similarly, the near angle scatter signal supplied through connection 32 is amplified in an amplifier 64 and supplied through a connection 66 to a sample and hold circuit 68. The output from the sample and hold circuit 68 is supplied through connection 70 and the gang switch 62 to the Y axis input of the oscilloscope 40. Thus, the oscilloscope 40 may display the function of absorption versus scatter for each particle. The sample and hold circuits 58 and 68 are pulse forming circuits or monostable multivibrators which hold the peak values of the respective absorption and scatter signals for a predetermined period longer than the actual duration of the input signals from the photoresponsive pick-up devices 24–28. In one preferred embodiment, the holding period is approximately forty microseconds. The maintenance of these maximum values by the sample and hold circuits 58 and 68 makes it possible to provide a display representing the combination of the maximum values for each particle as essentially a single point upon the face of the oscilloscope 40. Another essential element for this display is a brightening signal supplied to the oscilloscope on the third input Z as described more fully below.

The amplified absorption signal from amplifier 54 on output connection 56 is also supplied through a variable resistor 72 to an amplifier 74. Similarly, the amplified scatter signal from amplifier 64 is supplied through connection 66 and a variable resistor 76 to the input to amplifier 74 in common with the input through resistor 72. Accordingly, the amplifier 74 receives and amplifies the sum of fractions of the amplified absorption and scatter signals supplied through the variable resistors 72 and 76. The respective fractions of the signals are determined by the adjustments of the variable resistors. The amplified sum output from amplifier 74 is supplied through a threshold circuit 78, and a logical AND gate circuit 80 to the counter 36. The threshold amplifier circuit 78 operates to pass the amplified sum signal from amplifier 74 if that signal exceeds an adjustably determined threshold voltage value T2. The threshold value T2 is preferably set high enough to exclude "noise" signals from the system and to permit any legitimate particle detection signals to come through. Accordingly, the sum circuit, including amplifier 74, is employed to detect the presence of particles to be counted, and the resultant pulse signals are supplied to the counter 36 for individual registration and storage.

The sum signal from amplifier 74 is also supplied through a connection 98 and a threshold circuit 81 to both of the sample and hold circuits 58 and 68. The signal supplied through threshold circuit 81 is an enabling signal which causes the sample and hold circuits 58 and 68 respectively to respond to the input signals from the absorption amplifier 54 and the scatter amplifier 64. Thus, by appropriately setting the threshold T1 for threshold circuit 81, the sample and hold circuits are caused to respond only to the presence of legitimate particle signals. The threshold T1 is preferably set slightly below the threshold T2 so that the sample and hold circuits 58 and 68 are always enabled whenever a pulse is passed through threshold circuit 78 to be counted in the counter 36.

The utilization of the sum circuit 74, as described above, together with the threshold circuits 78 and 81, provides for a substantial enhancement in the sensitivity of the apparatus to signals which might otherwise be too weak to be recognized as legitimate signals. Thus, spurious noise signals may appear in the outputs from either the scatter amplifier 64, or the absorption amplifier 54. However, such noise signals will not usually appear concurrently. Accordingly, the summing amplifier 74 serves to discriminate between legitimate absorption and scatter signals which occur concurrently, and spurious signals, which may actually be of considerable amplitude.

The amplified absorption and scatter signals on connections 56 and 66 are also respectively supplied through variable resistors 82 and 84 to a difference amplifier 86. The output from amplifier 86 represents an algebraic difference between a fraction of the amplified absorption signal, as determined by the adjustment of resistor 82, and a fraction of the amplified scatter signal, as determined by the adjustment of resistor 84. This difference signal is supplied to two threshold circuits 88 and 90 which serve respectively as lower and upper limit circuits in passing difference signals respectively above an adjustable threshold T5 and below an adjustable threshold T6. An inverter 92 on the output of threshold circuit 90 reverses the effective operation of threshold circuit 90 from that of a lower limit to that of an upper limit circuit. The output signal from threshold amplifier 88, and the output of threshold circuit 90 inverted by inverter 92 are supplied to a logical AND gate 94 and thus through a further AND gate 96 to the counter 38. The AND gate 94 is a four input AND gate which responds only to the presence of input signals on all four of its inputs. The other two inputs are supplied from the sum amplifier 74 through a connection 98 and threshold circuits 100 and 102, the output from circuit 102 being inverted by an inverter 104. Thus, in order to obtain an output from AND gate 94, a particular particle must produce a sum signal through amplifier 74 which is between a lower threshold limit T3, as determined at threshold circuit 100, and an upper threshold limit T4, as determined at circuit 102, as well as producing a difference signal which is between the limits T5 and T6. Therefore, when the signals from a particular particle fall within all of these measurement thresholds, the particle is counted and the count is registered within the counter 38. This provides a very precise means for selecting and counting particles having particular characteristics, as will be described in more detail below particularly in connection with FIG. 3.

In order to be certain that the particles in the particular selected class which are counted in counter 38 are also particles which are counted in the total particle count recorded in counter 36, the AND gate 96 must be gated open by the output signal on connection 110 from the total particle count AND gate 80. Thus, no particle is counted in counter 38 unless it is also counted in counter 36.

By means of a connection 106 and a switch 108, the particle pulses received by counter 38 are also applied to control the brightening circuit Z of the cathode ray oscilloscope 40. Thus, with switch 108 in the position shown, only the data for the particles actually counted by counter 38 is displayed, because the cathode ray oscilloscope beam is brightened so as to be visible, only for those particular particle signals. If desired, switch 108 may be shifted to the other position for connection to a conductor 110 which carries the signals at the input to counter 36. Thus, the signals for all of the particles which are counted are then displayed by the oscilloscope 40.

The portion of the circuit of FIG. 2 associated with the photocells 46 and 48 for automatically measuring a predetermined volume of liquid containing particles is as follows. Photocell 46 is connected through a resistor 111 to an amplifier 112 to provide an output at connection 113 in response to the detection of liquid in the pipe 14 which focuses the light upon the photocell 46. Similarly, the presence of liquid opposite the photocell 48 provides a signal through resistor 114 to amplifier 115 to provide an output on connection 116. The outputs at 113 and 116 are supplied as the set inputs to a flip-flop 117. When both of these set inputs are present, the flip-flop 117 is shifted to the set state providing a logic zero output at the reset output connection 118. That reset output is inverted in an inverter 119 and supplied through a connection 120 and an AC coupling provided by a capacitor 121 to reset both of the counters 36 and 38. This signal also resets a flip-flop 138, the function of which is described below. An alternative reset signal source is provided by a manual reset pushbutton 122 for use when the automatic volume feature is not employed.

In order to prevent false operation of the volume measurement apparatus in response to a mere drop of water passing through the pipe 14, the amplifiers 112 and 115 are respectively shunted by capacitors 112A and 115A. These capacitors, in conjunction with the input resistors 111 and 114 provide each of the amplifiers 112 and 115 with a time delay response characteristic such that a time delay of several seconds is required during which the photocell must continuously "see" liquid in order to provide an effective output signal for changing the state of the flip-flop 117, or for accomplishing any of the other switching functions as described below. This time delay may preferably be in the order of 5 seconds. However, as soon as a photocell "sees" air instead of liquid, the resultant drop in the signal is a sudden drop because of the presence of the diodes 111A and 114A respectively shunting the resistors 111 and 114. Thus, if a mere drop of water is detected, the circuit is rapidly reset to re-commence the time delay cycle.

As soon as the flip-flop 117 is placed in the set condition, a resultant "set" output signal is supplied through a switch contact 123 and a connection 124 to the AND gate 80 to supply one of the enabling inputs to that AND gate. Subsequently, when the trailing edge of the sample of liquid passes photocell 46, the resultant change in the photocell output is detected from connection 113 through an inverter 125, a switch lever 126, and a connection 127 by the AND gate 80. This provides the final enabling signal to open gate 80 to commence the transmission of particle count signals through amplifier 78. The switch levers 123 and 126 are ganged together and may be shifted from the automatic position shown to a manual position in which voltage conditions are obtained such that the gate 80 is continuously enabled.

The output of the inverter 125 is also supplied as one of the reset inputs to the flip-flop 117. When the second photocell 48 detects the passage of the trailing edge of the liquid sample, the resultant signal change at connection 116 is detected through inverter 128 to supply the second reset input to flip-flop 117, causing the flip-flop to reset. This removes the set output supplied through switch 123 and connection 124 to gate 80 and thereby disables gate 80 and stops the counters 36 and 38. Thus, the count values stored in counters 36 and 38 are counts based exactly on a sample of particles taken from a volume of particle-containing liquid as measured by the volume stored between the photocells 46 and 48, and only the particles within that measured sample are visible by reason of the brightening signal supplied to the oscilloscope 40 through switch 108.

A third input is normally supplied on a continuous basis to AND gate 96 from the reset output of a flip-flop 138. However, this signal is discontinued when the flip-flop 138 is set by a signal on the set input of that flip-flop supplied through a switch 140 from counter 36. Switch 140 is a selector switch which may be used to select a desired output signal from counter 36 corresponding to the achievement of a particular count value in counter 36. Generally speaking, counter 36 counts all of the particles within a selected sample, and counter 38 counts only those particles meeting particular tests. By setting the selector switch 140, the counter 38 may be caused to stop at a particular selected total count value stored in counter 36. Then the count stored in counter 38 represents directly the ratio between the count value recorded in counter 38 and the selected total count of particles determined by the setting of switch 140. Preferably, the settings of the switch 140 may represent multiples of ten in the total count achieved by counter 36. The count value stored in counter 38 after that counter is stopped then provides a direct reading of the percentage of the total particles which have the particular characteristics to be detected by the circuits feeding AND gate 94. This is a particularly useful feature because it provides an automatic registration of a percentage value without the need for any separate calculation. Furthermore, the operation of the circuit associated with flip-flop 138 does not interfere with the further operation of the total particle counter 36. Thus, counter 36 may continue to count and register the total number of particles within a measured sample.

In a preferred form of the invention, the selector switch 140 not only selects multiples of ten in the total count, but it is also a gang switch having another rotary switch contact (not shown) which connects enabling voltage to selected decimal point positions in the counter 38 to provide appropriate exact indications of the percentage count ultimately stored in counter 38. The exactness of this percentage count is enhanced by reason of the control of AND gate 96 through connection 110 by the total particle count signal from gate 80. This input to AND gate 96 provides assurance that no particle will be counted by counter 38 as a member of the special selected class of particles unless it is also recognized as a particle to be counted in the total particle count register 36.

The apparatus of this invention may be employed to provide a permanent record of the test results. The counts stored by the counters 36 and 38 may be stored upon a suitable data record medium (not shown). Furthermore, a graphic record of the test is easily produced by exposing a photographic film to the optical signals produced on the face of the cathode ray oscilloscope 40. Each particle falling within the selected group of particles is then recorded by an exposure upon the film resulting from the point of light produced by the presence of that particular particle.

The oscilloscope 40 may be connected to register an indication of the sum and difference signals rather than the absorption and scatter signals. This is accomplished by shifting the gang switch 62 to the lower position to provide the output of the difference amplifier 86 through connection 142 to the Y axis input of oscilloscope 40, and to provide the sum signal output from amplifier 74 through connection 98 to the X axis oscilloscope input. The resistors 82 and 84 at the inputs of difference amplifier 86 are then easily adjusted so that the difference signal is essentially zero (no Y axis deflection) for particles having a minimum absorption characteristic. For instance, these particles may be unstained blood cells. By providing this particular adjustment, in which the minimum absorption signal is cancelled by subtraction of the scatter signal, a stained cell having substantial absorption is very easily distinguished because the apparatus detects only the increase in the absorption signal caused by the presence of the stain, while the scatter signal remains substantially constant or decreases for stained cells.

In order to make the absorption and scatter amplifiers 54 and 64 responsive only to changes in the optical pick-up signals from optical sensors 24–28 caused by passage of particles to be measured, clipper and integrator amplifiers are provided to produce feedback signals. Thus, at the output of absorption amplifier 54, there is provided a clipper amplifier 148 feeding an integrator amplifier 150 providing a feedback signal through feedback connection 152 to the absorption signal amplifier 54. The clipper amplifier 148 provides a clipped output which is not responsive to the peak signals produced by the passage of high absorption particles. The integrator amplifier 150 stores and amplifies an integrated value of the clipped output and supplies that integrated output as a negative feedback to amplifier 54, thereby making amplifier 54 substantially insensitive to steady state and low frequency inputs from the photoresponsive pick-up element 24. In a preferred embodiment, this insensitivity extends to "noise" of up to about 2,000 cycles per second. The actual particle signals have a rate of rise corresponding to a frequency above 2,000 cycles per second.

A clipper amplifier 154 and an integrator amplifier 156 are similarly connected to the output of scatter amplifier 64 and connected in a negative feedback loop 158 to provide for a similar steady state and low frequency elimination function for amplifier 64.

FIG. 3 illustrates how the thresholds T3, T4, T5, and T6 of the circuit of FIG. 2 may be set for the purpose of selecting only particle signals which fall within a desired area upon the face of the oscilloscope 40. The desired area may be referred to as a "window" because these thresholds define the boundaries of an area through which the observer is able to see a representation of the characteristics of only that group of particles which have been selected. The area may also be thought of as an electronically determined aperture. Thus, FIG. 3 represents patterns which may be established for the window or aperture upon the face of the cathode ray oscilloscope 40.

In the preferred form of the invention, absorption signals are applied to the X axis of the oscilloscope and scatter signals are applied to the Y axis. If the variable resistors 72 and 76 feeding the sum amplifier 74 in FIG. 2 are adjusted so that the absorption and scatter signals have a substantially equal effect in determining the output of the sum amplifier 74, then the lower limit threshold circuit 100 defines a lower limit threshold characteristic which is substantially a 45° line as illustrated at T3-1 in FIG. 3. Similarly, the upper limit threshold circuit 102 also defines a limit value represented by a 45° line represented at T4-1. The displacement of either of these arcs from the lower left corner of the display may be shifted by changing the value of the respective thresholds T3 and T4.

The difference signal from difference amplifier 86 represents mathematically a function of the absorption signal minus a function of the scatter signal. If the variable resistors 82 and 84 are adjusted so that the absorption and scatter inputs respectively have a substantially equal effect on the output of amplifier 86, then the shape and the slope of the boundaries of the window or aperture determined by threshold circuits 88 and 90 are each substantially 45° lines extending up to the right as represented by the lines T5-1 and T6-1 in FIG. 3. The vertical positions of these threshold lines may be adjusted by adjustment of the associated threshold values of T5 and T6. Thus, by reducing the value of either threshold, the corresponding threshold line is moved upwardly. Conversely, by increasing the threshold value, the threshold line is moved downwardly. Thus, by selecting threshold values and slope characteristics as described, the window or aperture defined by lines T3-1, T4-1, T5-1, and T6-1 may be caused to define a window to select particle characteristics within a predetermined area such as indicated at 160.

If a different area such as 162 is to be selected, then appropriate adjustments of the sum and difference amplifier ratios and the thresholds may be made to select that area instead of area 160. These modified thresholds are indicated by lines T3-2, T4-2, T5-2, and T6-2. While this second window is illustrated in FIG. 3 as though it occurred concurrently with the first window T3-1, T6-1, it will be understood that these two windows will not be present at the same time since they represent different modes of operation of the same components.

In order to obtain the sum threshold curves T3-2 and T4-2, the variable resistors 72 and 76 are adjusted to decrease the effect of the absorption signal supplied through variable resistor 72, and to increase the scatter signal supplied through variable resistor 76 to the sum amplifier 74. Thus, changes in the scatter signal have a major effect, and changes in the absorption signal have a very minor effect upon these characteristics.

In order to obtain the low slope threshold characteristics T5-2 and T6-2, the ratio of the inputs to the difference amplifier 86 is changed to reduce the effect of the scatter signal supplied through variable resistor 84, and to increase the effect of the absorption signal supplied through variable resistor 82. This makes these characteristics relatively independent of the scatter signal and dependent mostly upon the absorption signal on the horizontal axis. From this example, it is apparent that particular particle characteristics which may be represented by any particular display area upon the oscilloscope may be accurately selected by appropriate adjustments of the absorption and scatter signal inputs to the amplifiers 86 and 74, and by appropriate adjustments of the threshold controls for thresholds T3, T4, T5, and T6. This is a very important feature of the invention because it has been discovered that particular combinations of absorption and scatter are very significant in particle analysis, particularly where the particles may be human blood cells, and the characteristics may be indicative of the presence of a particular disease or defect. As indicated above, the counter 38 will count only those particles within the window defined by the thresholds T3, T4, T5, and T6. Accordingly, the accurate determination of the window boundaries provides a basis for obtaining a quantitative count of particles having particular characteristics.

This invention has been described entirely in terms of the detection of narrow angle optical scatter by the particles under observation, and in terms of the detection of direct optical absorption by those particles. However, it will be understood that various other combinations of optical reactions of the particles may be detected and analyzed by means of the system of the present invention without the need for substantial changes in the circuit of FIG. 2. For instance, as described in the related prior co-pending application mentioned above, wider angle scatter characteristics may be detected, and even back-scatter characteristics. It has been discovered that wide angle optical scatter by the particles can be used to measure the optical absorption by the particles, as absorption of the incident beam of light decreases the light scattered away from directions other than in the small angle scatter direction. It is advantageous to use the wide angle scatter to detect absorption because these optical signals are less sensitive to "noise" due to light source fluctuation or particle stream vibration than is the direct absorption sensor. Accordingly, while a direct absorption sensor 24 is illustrated and described, the wide angle scatter sensor is preferred for the purpose of detecting the optical absorption characteristic. Furthermore, the optical reactions to be measured need not necessarily be absorption or scatter signals. For instance, one or more of the optical reactions may be fluorescent emissions from the cells, and fluorescent emissions at particular wave lengths may be isolated by suitable optical filters.

While the system of this invention, and the circuit of FIG. 2, have been described in terms of the analysis of only two optical reaction characteristics of particles under analysis, it will be understood that the principles of the invention may be employed for the analysis of more than two optical reaction characteristics at a time. For this purpose, additional circuits which are substantial duplicates of the circuit of FIG. 2 may be employed to compare and analyze different pairs of optical reactions and the outputs of these separate circuits may be logically combined, such as with logical AND circuits, if desired, to select and count only a very exclusive group of particles indicative of particular conditions to be detected.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

We claim:

1. A method for rapidly measuring and detecting small particles in a sample of particles to be analyzed including
    passing the particles one by one in a stream through a transverse beam of illumination,
    measuring at least two different optical reactions to the beam by each particle by means of electro-optical devices to generate electrical signals,
    summing the electrical signals,
    and testing the resultant sum signal to determine whether it exceeds a predetermined threshold to thereby discriminate true particle reaction signals from spurious noise signals.

2. A method as claimed in claim 1 including
    the additional step of counting the sum signal pulses to obtain a count of the total number of particles within a particle sample.

3. Apparatus for optically detecting the presence of very small particles such as blood cells and for counting the number of such particles suspended in a sample of liquid containing such particles comprising a housing having light-pervious walls defining an optical chamber, means for moving the particle suspending liquid through said chamber in a stream to convey the particles in sequence through the stream one by one, a light source for directing light through said housing to intersect with the stream of particles, at least two photoresponsive pick-up elements positioned outside of said housing and effective to simultaneously detect different optical reactions of each particle to illumination from the beam and to generate electrical signal pulses in response to the optical reactions to the particles, means connected to receive and add said signal pulses to generate a sum signal pulse to indicate the presence of each particle by the concurrent presence of both of said electrical signal pulses.

4. Apparatus as claimed in claim 3 including a separate amplifying means connected to each of said photoresponsive pick-up elements for receiving said electrical signal pulses and for separately amplifying said respective signal pulses before said signal pulses are supplied to said sum signal means, and means for separately adjusting the amplified signal pulses supplied to said sum signal means to provide a weighted sum signal pulse to thereby enhance the discrimination of true particle reaction signals from spurious noise signals.

5. Apparatus as claimed in claim 4 including means connected to both of said separate amplifying means for receiving said respective electrical signal pulses and operable to generate a difference signal pulse, means for separately adjusting the amplification gain with respect to said signal pulses to thereby adjust the ratio of said amplified signal pulses at the input to said difference signal means to thereby provide a zero difference output signal pulse for the condition in which the particle characteristics causing the optical reaction signals are not to be detected, said difference signal pulse means being effective to provide a substantial difference output signal when said optical reaction signals are to be detected.

6. Apparatus as claimed in claim 3 wherein there is provided a threshold circuit connected to receive the sum signal pulses from said sum signal means and operable to pass only those sum signal pulses which exceed a predetermined threshold value.

7. Apparatus as claimed in claim 6 including a counter connected to said threshold circuit and responsive to the sum signal pulses passed by said threshold circuit for counting and recording each of said pulses.

8. Apparatus as claimed in claim 7 including an elongated container means associated with said means for moving the particle suspending liquid through which said liquid is conveyed to said chamber, a first detecting means arranged at the entrance of said container means for detecting the presence of liquid therein and for generating an electrical signal in response thereto, a second detecting means at the exit end of said container means for detecting the presence of liquid therein and for generating an electrical signal in response thereto, a logic circuit means connected between said counter and said first and second detecting means, said logic circuit means being operable to reset said counter in response to liquid detection signals from both of said detection means and to start the count operation of said counter upon the discontinuance of the liquid detection signal from said first detection means and to stop the count operation of said counter upon the subsequent discontinuance of the liquid detection signal from said second detecting means to thereby provide a count of the number of particles within a sample having a volume corresponding to the volume of said elongated container.

9. Apparatus as claimed in claim 8 wherein said detecting means are each operable to provide a first signal as a liquid detection signal and a second signal upon discontinuance of the liquid detection signal, said logic circuit means including a flip-flop circuit having an AND gate set input connected to receive said first signals from both of said detecting means to thereby set said flip-flop only in the presence of both of said first signals, said flip-flop circuit being connected to provide a reset signal to said counter when said flip-flop is set, said logic circuit means including an AND gate connected to receive a set output from said flip-flop and said second signal from said first detecting means as enabling signals for enabling said counter, said flip-flop circuit having an AND gate reset input connected to receive said second signals from both of said first and second detecting means and operable to reset said flip-flop only in the presence of both of said second signals, the resetting of said flip-flop being effective to discontinue the set output therefrom to thereby disable said counter.

10. Apparatus as claimed in claim 9 wherein each of said detecting means comprises a photocell and a light source for illuminating said photocell through said container means, said container means being comprised of an optical light conducting material.

11. Apparatus for optically distinguishing particles having particular characteristics within a group of particles including particles which do not have said characteristics and for automatically computing the fraction of the total number of particles within a particle sample which has said particular characteristics comprising apparatus arranged to receive a sample of particles to be checked in a thin stream such that said particles flow through a check point one at a time, said apparatus including a first means for generating an electrical signal pulse upon the passage of each particle to be checked, a first counter connected to count said signal pulses from said first means, said apparatus including a second means for generating an electrical signal pulse in response to the passage of each particle having the particular feature to be detected, a second counter connected to count such last mentioned signal pulses from said second means, said first counter being operable to issue an output signal upon the achievement of a predetermined count value, said first counter being connected to supply said output signal to said second counter, said second counter being operable upon the reception of said last mentioned signal to discontinue the counting operation thereof to thereby automatically indicate the ratio between the count value recorded by said second counter and said predetermined count value.

12. A system as claimed in claim 11 wherein said predetermined count value at which said first counter generates said signal to stop said second counter is equal to a number which is a power of ten so that the ratio between the count stored in said second counter after it is stopped and said predetermined count of said first counter represents a percentage ratio.

13. A method for optically distinguishing particles having different characteristics including passing the particles one by one through a transverse beam of optical illumination, detecting at least two different optical reactions of each of the particles to said illumination by means of electro-optical devices to generate electrical signal pulses, and measuring the ratio between the respective numbers of said separate electrical signal pulses from said respective different optical reactions and detecting changes in that ratio as a basis for distinguishing particles having particular characteristics to be detected.

14. A method as claimed in claim 13 wherein
the ratio between said separate electrical signal pulses is measured by subtracting a predetermined function of one of said signal pulses from a predetermined function of the other of said signal pulses.

15. Apparatus for optically distinguishing different characteristics of very small particles such as blood cells comprising
a housing having light pervious walls defining an optical chamber,
means for moving the particles through the chamber one by one,
a light source for directing light to the particles,
at least two photoresponsive pick-up elements positioned outside of said housing at different angular positions with respect to the direction of said beam when measured from the intersection of the beam with the particles,
said photoresponsive pick-up elements being effective to simultaneously detect different optical reactions of each particle to illumination from the beam and
to generate electrical signals in response to the optical reactions to the particles,
circuit means connected to said photoresponsive pick-up elements for receiving said electrical signals and
operable to detect changes in the ratio of one of said signals to the other of said signals as a basis for distinguishing particles having particular characteristics to be detected.

16. A system as claimed in claim 15 wherein
said circuit means is operable to detect a departure of said signals from a predetermined ratio defining a condition which is not to be detected by said apparatus,
the departure of said signals from said predetermined ratio being used to distinguish particle characteristics to be detected.

17. Apparatus as claimed in claim 16 wherein
said predetermined ratio of said circuit means is determined by subtracting a predetermined function of one of said signals from a predetermined function of the other of said signals.

18. Apparatus as claimed in claim 17 wherein
said predetermined function of one of said signals is equal to said predetermined function of the other of said signals for said condition which is not to be detected by said apparatus so that the result of the subtraction is zero for said predetermined ratio.

19. A method for optical analysis of small particles such as blood cells for accurately distinguishing the number of cells in the total cell population having particular distinctive characteristics comprising the steps of
subjecting the individual particles successively to optical radiation,
measuring at least two different optical reactions of each particle to the optical radiation and generating two different electrical signals respectively in response thereto,
generating a first set of separate function signals from each of said different electrical signals,
adding said last-named function signals to obtain electrical sum signals,
counting said sum signals to record the total number of particles in a selected sample,
generating a second set of separate function signals from each of said different electrical signals,
subtracting one member of said second set of function signals from the other to obtain a difference signal,
and selecting all of those particles within the total selected sample of particles which have the distinctive characteristics to be detected by counting the combination of said two different electrical signals only from those particles which provide a sum signal between predetermined signal levels and a difference signal between predetermined signal levels.

20. A method as claimed in claim 19 wherein
said two different electrical signals and said function signals and said sum and difference signals are all in the form of discrete electrical pulses.

21. A method as claimed in claim 1 wherein
said electrical signals from said electro-optical devices are adjusted to provide selected functions of said optical reactions prior to producing the sum of the electrical signals to thereby produce a weighted sum for enhancement of the discrimination of true particle reaction signals from spurious noise signals.

22. Apparatus as claimed in claim 4 wherein
each of said separate amplifying means includes a main amplifier and a clipper amplifier and an integrator amplifier connected in cascade,
said clipper amplifier and said integrator amplifier being operable to provide a negative feedback signal to said main amplifier which represents an integrated value of the clipped output of the clipper amplifier to thereby make said main amplifier substantially insensitive to steady state and low frequency inputs from the associated photoresponsive pick-up elements.

23. Apparatus as claimed in claim 22 wherein
said clipper amplifier and said integrator amplifier are effective to make said main amplifier insensitive to all inputs having a rise time equivalent to a frequency below about two thousand cycles per second.

24. Apparatus as claimed in claim 4 including
means connected to both of said separate amplifying means for receiving said respective electrical signal pulses and operable to generate a difference signal pulse,
means for separately adjusting the amplification gain with respect to said signal pulses to thereby adjust the ratio of said amplified signal pulses at the input to said difference signal means,
upper and lower threshold circuit means connected to said adding means to select sum signals having amplitudes between the thresholds set by said upper and lower threshold circuit means,
upper and lower threshold circuit means connected to receive said difference output signals from said difference signal pulse means and operable to select difference output signals having amplitudes between the thresholds set by said last-mentioned threshold circuit means,
and a coincidence circuit means connected to receive and pass signals only upon the concurrence of signals which pass said sum circuit threshold circuits and said difference circuit threshold circuits for the selection of particles having distinctive characteristics to be detected.

25. Apparatus as claimed in claim 24 including a cathode ray oscilloscope,
the deflection circuit of said cathode ray oscilloscope for one axis being connected to receive said sum signal pulses,
the deflection circuit of said cathode ray oscilloscope for the other axis of deflection being connected to receive said difference output signal pulses,
and the output of said coincidence circuit means being connected to a cathode beam intensifier circuit of said cathode ray oscilloscope to thereby intensify and make visible only those points defined by the time coincident sum and difference pulse signals representative of particles having characteristics within said sum and difference thresholds.

* * * * *